Figure 1:
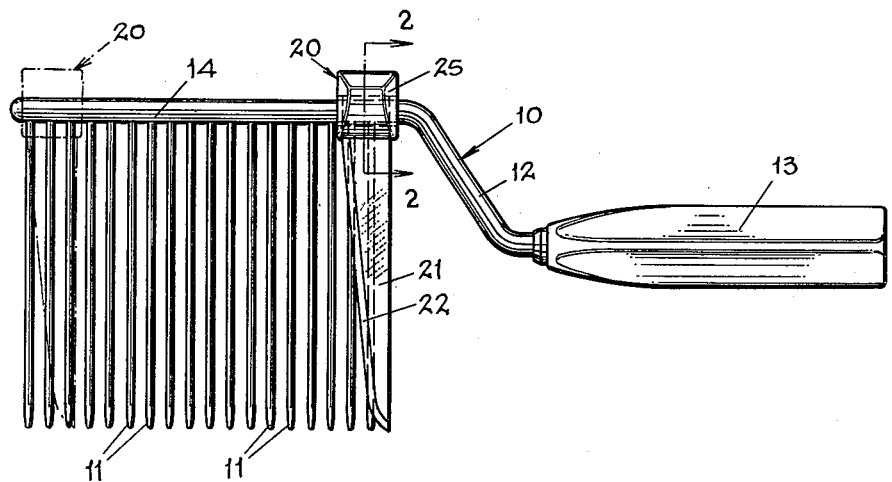

March 11, 1952 — C. J. SCHNEIDER — 2,588,579
CAKE BREAKER AND CUTTER
Filed Dec. 4, 1950

Inventor
Cale J. Schneider

Patented Mar. 11, 1952

2,588,579

UNITED STATES PATENT OFFICE 2,588,579

CAKE BREAKER AND CUTTER

Cale J. Schneider, Toledo, Ohio

Application December 4, 1950, Serial No. 199,051

2 Claims. (Cl. 30—115)

My invention relates fundamentally to the cutting arts. Particularly, however, my invention is concerned with dividing a body into parts. To that end, my invention provides a utensil adapted for slicing bodies, such as those of food and particularly layer and sponge cakes and the like, into portions of a convenient size and shape for serving.

The difficulty of dividing aerated, spongy or fluffy bodies without crushing the body is well known. The complications that the presence of frostings on cake bodies adds to the situation are also recognized. I believe that the utensil shown in my United States Patent No. 1,858,790, issued May 17, 1932, was among the earliest attempts to provide a utensil by the use of which servings, without crushing, could be produced. This utensil had several disadvantages. To provide means for overcoming these disadvantages is one of the primary objects of my present invention.

Successful use of my earlier invented utensil required the user to handle the utensil in ways with which the user was unaccustomed and hence found unnatural. This perhaps was one of the most noticeable disadvantages of the earlier utensil. Those familiar with the utensil recall that its operational principle was that of "breaking" rather than slicing the body. In order to break the body, the user was obliged to carefully rotate the utensil after the utensil's breaking prongs penetrated the body. Oftentimes, especially in making the first of a series of wedge shaped "cuts" from a layer cake, it was nearly impossible to rotate the utensil sufficiently to make the necessary initial partition without also undesirably breaking the cake elsewhere.

Another disadvantage of my prior utensil lay in the tendency of pieces, crumbs and particles of the body being partitioned to collect on and adhere to the penetrating prongs. The presence of these, unless removed from the prongs, fouled subsequent insertion of the prongs, preliminary to "breaking" another portion from the body. The adherence of sticky frostings, nuts and fruits to the prongs very often made subsequent use of the utensil impossible.

My present invention overcomes these disadvantages. Beyond this my present invention provides means by which true body cutting operations may be effected without crushing the body. Hence, there will be no further need to manipulate the utensil as was required for breaking.

Also my invention provides prong stripping means by which pieces, crumbs and particles are removed from the prongs.

My invention has dual objectives: one is to provide a new combination including a utensil like that of my previous Patent No. 1,858,790 with a cooperating cutter element; and the other is to provide a new and novel cutter element adapted for cooperating with such utensils. By attaining the latter objective users of my previously patented utensil may easily adapt the same to secure the advantages of my invention.

In the new combination of cutter and breaker there are many advantages, aside from eliminating the need for breaking in order to effect partition. Most important, I believe, is the fact that the prongs when inserted into the body to be cut, at various points along the proposed cutting plane, and substantially at right angles to the direction of cutting pressure, provide body reinforcing or retaining members in a sort of grill relation. Thus the cutting pressure on the body at any moment exerts itself against only a very small and definitely limited portion of the body which is free to expand and absorb the pressure without materially compacting the body. Also at intervals across the body, the prongs serve to take the cutter pressure, one of the prongs being always in contact with the cutter.

Another feature which I believe novel in the combination is the provision by which the cutter guided by the arm supporting the mentioned prongs moves horizontally through the body—as distinguished from a downward vertical movement. This provision by which a horizontally directed cutting action is obtained is believed new so far as domestic users are concerned.

A more particular object of the invention is to provide a cutter element having an extending blade-like part with bearing means at one end adapted to engage the breaker-like utensil member and be thereby supported for movement on the utensil member. A still further and particular object is to provide bearing means by which the blade-like part is movably supported in shearing relation to the utensil prong parts—so as to slidingly contact each prong part and move in a path bridging the spaces between adjacent prong parts. By reason of this relation between the prong parts and the blade-like element, the prong parts will be stripped of pieces, crumbs and the like by the element in passing over the prong parts.

The invention consists in other features and advantages which will appear from the following description and upon examination of the drawings. Structures containing the invention may partake of different forms and still embody the invention. To illustrate a practical application of the invention, I have selected a cutter as an example of the various structures and details thereof that contain the invention and shall describe the selected structure hereinafter, it being understood that variations may be made without departing from the spirit of the invention. The particular structure selected is shown in the accompanying drawing and described hereinafter.

Figure 2:
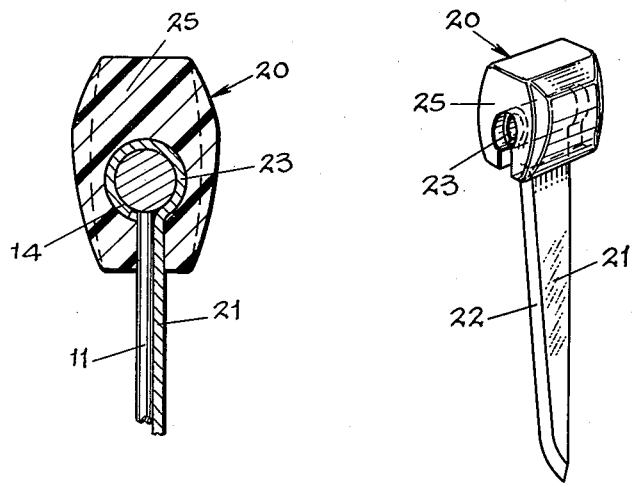
Figure 3:
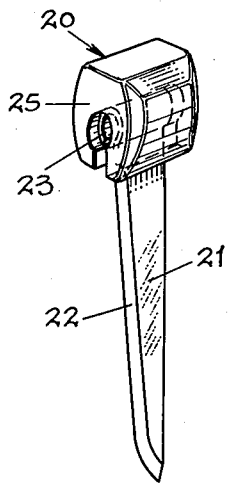

Fig. 1 of the accompanying drawing illustrates a side elevation of a cutter combination embodying the features of my invention. Fig. 2 illustrates an enlarged view of a section taken on the plane of the line 2—2 indicated in Fig. 1. Fig. 3 illustrates a perspective view of the new and novel cutter-like element invented by me and forming part of the combination shown in Fig. 1.

Referring to Fig. 1 of the accompanying drawing, one will observe that the combination embodying my invention comprises that of the utensil 10 and a cutter-like element 20.

The utensil 10 has pins or prong parts 11 which project downwardly from an aligned spaced succession of points on an arm 14. The prong parts 11 extend parallel to each other and may, as shown, have sharpened ends for purposes presently appearing. The arm 14 has an extension 12 and handle 13 by which the arm may be easily manipulated.

Those familiar with my earlier patented utensil will recognize that in the described relation of arm 14, prong parts 11, handle 13 and extension 12, I have specific reference to that utensil. Of course, one may use other than this specific utensil to obtain the advantages of my present invention.

The cutter-like element 20, probably best shown in Fig. 3 of the accompanying drawing, has an extending part which, in the selected embodiment, consists in a blade 21. The blade 21 has long side edges 22 and 24. Edge 22 is preferably sharp so that it may more easily cut through material it engages. The element 20 also has at one end of the blade 21 a sleeve-like portion 23 which extends arcuately about a line parallel to the blade plane and extending between blade side edges 22 and 24. The arcuate sleeve-like portion 23 provides, as best shown in Fig. 2, a bearing adapted to slidably engage the lateral surface of arm 14 thus supporting the cutter element 20 for movement along the arm 14. Two extremes of this movement are shown in Fig. 1 of the accompanying drawing—one in full line and the other in broken line.

The portion 23 is related in position to the blade 21 as to support the blade for slidable engagement with each successive prong 11 as the element 20 is moved along arm 14. Also in such movement the blade 21 will pass through a path which bridges the spaces between adjacent prongs 11. Thus, any material about or between the prongs 11 will, on passing of the element 20 from its full line to the broken line positions shown in Fig. 1 be severed in a plane coinciding substantially with that of the prongs 11. It will be also noted (see Fig. 1) that in the relation of each successive prong 11 to the blade 21, particularly its edge 22, at the moment of passing there is shearing action. Desirably, therefore, the edge 22 is ground to extend in inclined relation to prongs 11 as shown in Fig. 1 of the accompanying drawing. With this arrangement the edge 22 always engages at least one prong of the succession on the arm 14 and relieves the body being cut from sustaining that pressure.

In order to facilitate moving the element 20, I provide it with a handle knob 25. The handle 25 incloses the sleeve-like portion 23 and imparts a finished appearance to the element 20.

In use the element 20 is in the full line position shown in Fig. 1. The handle 13 may be grasped in the right hand and the knob 25 in the left. Then by cooperative movement of both hands the prongs 11 are directed endwise into a body such as a cake to be cut. The prongs 11 are directed into the cake so as to substantially coincide with the plane of proposed partition. Now, the user, while retaining the arm 14 and prongs 11 stationary by means of the handle 13, moves the element 20 along the arm 14 in a direction away from the handle 13—to the broken line position shown in Fig. 1 of the accompanying drawing.

When this has been done it will be found that the cake body will have been severed in a plane substantially coinciding with the plane of insertion of the prongs 11. The cutter may then be withdrawn and again the prongs be inserted in the body to make subsequent cuts. Or, if desired, the cut piece may be scooped up by the prongs 11 to rest thereon and be thereby conveyed from the cutting plate to some other place.

It will be appreciated that each prong 11 during the cake severing action acts to sustain the cake body against compression exerted when the element 20 is traversing the arm 14. Also the prongs 11 in effect divide the body into a plurality of vertical extending zones each of which by reason of the prongs 11 defining it, withstands the compressing pressure of cutting applied to it. This prevents the compressing pressure from producing general cross-sectional compaction of the cake.

Also by sliding the element 20 forward and back along arm 14, any crumbs, nuts, fruits or frosting which might otherwise adhere to the prongs 11 will be stripped away. This is an important advantage to those who are content or, by reason of body being cut, are obliged to use the breaking action of partition made possible by rotating the member 10.

While I have illustrated and described the best form of my invention now known to me, as required by the statutes, those skilled in the art will readily understand that changes may be made in the disclosed construction without departing from the spirit of my invention as set forth in the appended claims.

I claim:

1. A cutter for bodies such as food and the like comprising the combination of a manipulatable body penetrating member and a cutter element on and movable relative to the member; the member having an elongated arm and a plurality of parallel and spaced straight prong parts normal to the arm and in a common plane adapted, when the member is manipulated, to endwise penetrate a body to be partitioned along a succession of parallel lines in a plane of proposed partition; the cutter element having a flat blade part and bearing means at one end of the part, the bearing means having a surface in slidable contact with said member arm to support the blade part for movement in sliding contact with each of a succession of said prong parts and through a path across the spaces between said prong parts to thereby successively sever portions of the body adjacent and between the prong parts.

2. An article of manufacture adapted to serve as a cutter element for a food breaker having an arm and a plurality of parallel pins lying in a common plane and extending from an aligned and spaced succession of points on the arm, said pins being adapted to penetrate a body to be partitioned along a succession of lines in the proposed plane of partition in response to manipulation of the food breaker arm, said cutter element having a flat blade with two long opposite side edges and an end, said end comprising an arcuate, sleeve-like extension bent about a line axis parallel to the blade plane, the arcuate extension of the blade having an inner slide bearing surface adapted for slidable engagement of the food breaker arm surface thus to support the blade for movement in sliding contact with the food breaker pins and through a path across the spaces between the pins, one of said side edges being inclined to the other and being sharp thereby to sever the body penetrated by the pins in the plane of pin penetration.

CALE J. SCHNEIDER.

REFERENCES CITED

The following references are of record in the file of this patent:

UNITED STATES PATENTS

| Number | Name | Date |
|---|---|---|
| 1,324,565 | Przybylek | Dec. 9, 1919 |
| 1,585,533 | Coursen et al. | May 18, 1926 |
| 1,858,790 | Schneider | May 17, 1932 |
| 2,081,011 | Lautmann | May 18, 1937 |